United States Patent Office 3,418,342
Patented Dec. 24, 1968

3,418,342
ANTHRAQUINONE DYES
Paul Buecheler, Reinach, Basel-Land, Switzerland, assignor to Sandoz Ltd. (also known as Sandoz A.G.), Basel, Switzerland
No Drawing. Filed Apr. 23, 1964, Ser. No. 362,192
Claims priority, application Switzerland, Apr. 23, 1963, 5,094/63
10 Claims. (Cl. 260—377)

This invention relates to dyes of the anthraquinone series which contain 1 to 4 carbamidoalkylamino groups in α-positions, to a process for their production and to their use.

The preferred compounds have the formula

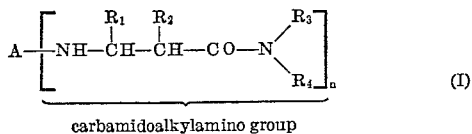

carbamidoalkylamino group

In this formula A stands for an anthraquinone radical, $R_1$ for hydrogen or low-molecular alkyl, in particular methyl, $R_2$ for hydrogen or low-molecular alkyl, in particular methyl, $R_3$ for hydrogen or substituted or unsubstituted alkyl, cycloalkyl or aryl, $R_4$ for hydrogen or substituted or unsubstituted alkyl, cycloalkyl or aryl, and $n$ for one of the integers 1, 2, 3 or 4; the carbamidoalkylamino groups occupy α-positions in the anthraquinone molecule. The radicals $R_3$ and $R_4$ can be linked to each other either directly or through hetero atoms.

When the anthraquinone radical A, alkyl radicals $R_1$ and $R_2$ and alkyl, cycloalkyl and aryl radicals $R_3$ and $R_4$ are substituted, the substituents are preferably non-water-solubilizing, which excludes the sulfonic acid group and the carboxylic acid group.

For the production of the new compounds, anthraquinone compounds containing at least one carboxyalkylamino group in an α-position, i.e. compounds of the formula

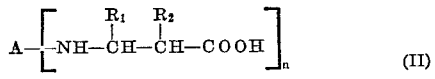

are reacted with ammonia or with a primary or secondary amine. Preferably they are reacted with a compound of the formula

in the presence of the halide of an inorganic acid, or more particularly the chloride of an inorganic acid or phosphorus pentachloride.

The carboxyalkylaminoanthraquinones (II) used as starting products can be produced, for instance, according to the method described in Swiss Patent 357,129, by reaction of anthraquinone compounds bearing 1 to 4 amino groups in α-positions with acrylic acid, α-methacrylic acid or crotonic acid, or by reaction with the esters or nitriles of the latter and subsequent saponification.

For example, the carboxyalkylaminoanthraquinone and the amine can be suspended or dissolved in an inert organic solvent, and an inorganic acid chloride, in particular phosphorus trichloride or phosphorus pentachloride, added to the suspension or solution at about 0° to 50° C. If the amine is gaseous it is best to conduct it into the suspension or solution before and/or during the addition of the inorganic acid chloride, if necessary under pressure. It is of great advantage to employ a sufficiently large excess of the amine or, additionally to the amount of amine necessary for the reaction, a sufficiently large amount of a tertiary base, e.g. pyridine, trimethylamine or dimethylaniline, so that all the acid set free by the reaction is bound, i.e. at least 1 equivalent of the amine of Formula III and 1 equivalent of the tertiary base or at least 2 equivalents of the amine of Formula III, calculated on the equivalents of the acid groups in the compound of Formula II. Then the condensation of the carboxyalkylaminoanthraquinone (II) with the amine (III) is brought to an end at a temperature between about 0° and 100° C., the time required for this being between about 15 and 60 minutes.

Under "inert organic solvents" are understood those which do not react with the reactants or with the reaction products under the conditions of the reaction. Especially suitable solvents are, e.g., petroleum ether and other liquid aliphatic hydrocarbons, methylene chloride, chloroform, carbon tetrachloride, dichloroethane and other halogenated, in particular chlorinated, aliphatic hydrocarbons, aromatic hydrocarbons, halogenated aromatic substances, e.g. benzene, toluene or chlorobenzene, nitrated aromatic substances, e.g. nitrobenzene, dioxan and other cyclic ethers, or aliphatic ethers, e.g. diethyl ether.

Of the inorganic acid chlorides, thionyl chloride, phosphorus trichloride and phosphorus oxychloride may be specially named. Phosphorus pentachloride, phosphorus tribromide and phosphorus pentabromide are also very suitable.

Suitable primary and secondary amines belong to the series of alkyl amines having one to six carbon atoms, which can be substituted, e.g. by hydroxy groups, alkyl groups having one to four carbon atoms, or alkoxy groups having one to four carbon atoms. Examples of these amines are ethyl amine, diethyl amine, 2-hydroxyethylamine, 3-methoxypropylamine, di-n-butylamine, n-amylamine, 2-ethylhexylamine, and benzyl amine; amines of the series of the cycloalkyl amines having preferably six carbon atoms, in particular cyclohexylamine; or amines of the benzene series which can be substituted, for example, by one or more of the following substituents: halogen atoms, alkyl groups having one to eight carbon atoms, hydroxy groups, alkoxy groups having 1 to four carbon atoms, aryl or aryloxy radicals, alkylthio or arylthio radicals, alkyloxycarbonyl groups having one to four carbon atoms, nitro-, cyano- or trifluoro-methyl groups, e.g. aminobenzene; N-methylaminobenzene; 2-chloro-, 2-methoxy-, 2-phenoxy- or 2-methoxycarbonyl-1-aminobenzene; 3 - cyano-1-aminobenzene; 4-chloro-, 4-phenyl-, 4-methoxy-, 4-phenoxy- or 4-(4′-chloro) - phenoxy - 1 - aminobenzene; 2,4-dinitro-1-aminobenzene; 3,5-di-trifluoromethyl-1-aminobenzene. Morpholine is an example of a particularly well suited heterocyclic amine. Aminoazo compounds too, e.g. 4-amino-1,1′-azobenzene, 4-amino-(2′-hydroxy-5′-methyl)-azobenzene and highly condensed amines, such as 1-amino-5,6,7,8-tetrahydronaphthalene, can be used as compounds of Formula III.

Specially preferred dyes of the Formula I have the formula

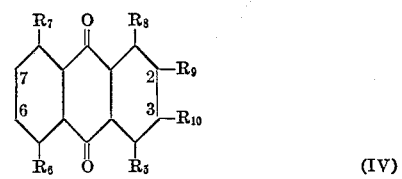

In this formula each of the symbols $R_5$ to $R_8$ stands for a hydrogen atom, for a hydroxyl group, a primary or secondary amino group, a nitro group or for a group of the formula

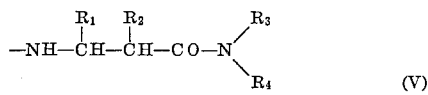
(V)

wherein at least one of the symbols $R_5$ to $R_8$ stands for a group of the Formula V. Under "secondary amino groups" are understood those of the formula

 (VI)

wherein $R_{11}$ stands for an alkyl radical having 1 to 4 carbon atoms, preferably methyl, for a cycloalkyl radical, preferably cyclohexyl, or for a phenyl radical which can be substituted, e.g. by alkoxy radicals having 1 to 2 carbon atoms.

In the Formula V the two symbols $R_1$ and $R_2$ stand for hydrogen, or one of these symbols stands for hydrogen and the other for methyl.

$R_3$ represents a hydrogen atom or a substituted or unsubstituted alkyl radical, in particular one having 1 to 4 carbon atoms; $R_4$ represents a hydrogen atom or a substituted or unsubstituted hydrocarbon radical, in particular a substituted or unsubstituted alkyl radical having 1 to 8 carbon atoms, or a substituted or unsubstituted phenyl radical, or the cyclohexyl or ar-tetrahydronaphthyl radical-1; or $R_3$ and $R_4$ represent the atoms necessary for the formation together with —N< of the morpholine radical. Dyes with particularly good properties contain as radical

e.g. the radical

(VII)

where $R_{12}$ and $R_{13}$ represent alkyl radicals having 1 to 4 carbon atoms which may be substituted by a low-molecular alkoxy group; or the radical

(VIII)

where $R_{14}$ represents a substituted or unsubstituted alkyl radical having 1 to 4 carbon atoms and $R_{15}$ a phenyl radical which may be substituted by halogen, in particular chlorine or bromine, low-molecular alkyl, notably methyl, or low-molecular alkoxy, notably methoxy; or the radical

(IX)

where $R_{16}$ stands for an alkyl radical having 1 to 4 carbon atoms which can be substituted by alkoxy having 1 to 4 carbon atoms, for an alkyl radical having 5 to 8 carbon atoms, a benzyl, cyclohexyl or ar-tetrahydronaphthyl-1 radical or a phenyl radical which may be substituted by hydroxyl, alkyl having 1 to 8 carbon atoms, alkoxy having 1 to 4 carbon atoms, halogen, in particular fluorine, chlorine or bromine, nitro, alkyloxycarbonyl having 1 to 4 carbon atoms in the alkyl radical, trifluoromethyl, phenyl, chlorophenyl, phenyloxy, chlorophenyloxy, alkylthio having 1 to 4 carbon atoms, phenylthio, cyan, or substituted or unsubstituted phenylazo.

Finally, $R_9$ in Formula IV can represent, besides hydrogen, preferably halogen, in particular chlorine or bromide, alkyl, alkoxy or alkylthio, all having preferably 1 or 2 carbon atoms, cyano, or substituted or unsubstituted phenyloxy or phenylthio, and $R_{10}$, besides hydrogen, stands for one of the substituents named under $R_9$ or for nitro, hydroxyphenyl, or lower alkoxyphenyl having 1 or 2 carbon atoms in the alkoxy radical. When $R_9$ and $R_{10}$ are both other than hydrogen, then 2,3-dihalogeno-, 2,3-dicyano-, 2,3-dialkoxy-, substituted or unsubstituted 2,3-diphenyloxy- and 2,3-diphenylthio-anthraquinone derivatives are especially preferred.

The dyes are isolated in the normal way, e.g. by filtration, precipitation from the solvent, or elimination of the solvent by distillation in water vapor.

The new dyes containing no carboxylic acid or sulfonic acid groups are valuable disperse dyes. In general, they are soluble in the standard organic solvents, e.g. those named for the condensation of the compounds of Formula II with amines of Formula III, and also in other weakly polar to moderately strong polar solvents, such as the ketones or alcohols, e.g. butanol.

It is very advantageous to convert the new dyes into dyeing preparations before use. For this purpose the known methods are used. The dye is comminuted until the average particle size is between 0.01 and 10 microns, or more particularly between about 0.1 and 5 microns. Comminution can be carried out in the presence of dispersing agents and/or fillers. For example, the dried dye can be ground with a dispersing agent and a filler if necessary, or kneaded in paste form with a dispersing agent and then dried in a vacuum or atomizing drier. The resulting preparations are dispersed in a suitable volume of water and applied to the substrate by a dyeing process at a long or short goods to liquor ratio or by a padding or printing process.

When the dyes are dyed at a long liquor ratio, up to about 20 grams of dye are generally used per liter of water; for dyeing at short liquor ratio, up to about 80 grams per liter. For pad application the dye concentration may be anything up to about 150 grams per liter. In printing, the print pastes contain up to about 150 parts by weight per 1000 parts of paste. The liquor ratio can vary within wide limits, e.g. from 1:3 to 1:200, or preferably between 1:3 and 1:80.

The dyes build up excellently on textile materials and other materials made of fully synthetic or semi-synthetic, high-molecular products, e.g. filaments, fibers and other shaped goods of cellulose esters, cellulose ethers, linear aromatic polyesters, synthetic polyamides, polyurethanes, and polyvinyl esters. Very valuable dyeings are obtained on linear aromatic polyesters.

These are generally polycondensation products of terephthalic acid and glycols, notably ethylene glycol, and are commercially available under the registered trade names "Terylene," "Diolen" and "Dacron." "Kodel," which is stated to be a condensation product of terephthalic acid and 1,4-bis-(hydroxymethyl)-hexahydrobenzene, can also be dyed with the new dyes.

The new dyes are applied by the known methods. Polyester fibers can be exhaustion dyed in the presence of a carrier in the temperature range of from 80–125° C., or in the absence of carrier at about 100–140° C. with pressure. They can also be padded or printed with the new dyes, in which case the padded or printed goods are fixed at about 140° to 230° C. using, e.g., water vapor, contact heat, or hot dry air. Cellulose triacetate is dyed preferably at temperatures up to about 115° C. The optimum pH region is 2–9, or preferably 4–8.

In most cases the dyes are applied with one of the dispersing agents in general use, preferably one of anionic or nonionic character. Mixtures of dispersing agents can be used. About .5 gram of dispersing agent per liter of the dyeing medium is usually sufficient, but greater amounts can be used, e.g. up to about 3 grams per liter. Amounts in excess of 3 grams do not normally offer any advantage. Known anionic dispersing agents suitable for use with the dyes are, for example, the condensation products of naphthalene sulfonic acids and formaldehyde, notably dinaphthyl methane disulfonates, the esters of sulfonated succinic acid, Turkey red oil, the alkaline salts of the sulfuric acid esters of fatty alcohols, e.g. sodium lauryl sulfate and sodium cetyl sulfate, sulfite cellulose waste liquor and its alkaline salts, and the soaps or alkali sulfates of monoglycerides of fatty acids. Examples of known and especially suitable nonionic dispersing agents are the addition products of about 3 to 40 moles of ethylene oxide and alkyl phenols, fatty alcohols, fatty amines, or their neutral sulfuric acid esters.

The commonly used thickening agents are employed in padding and printing, e.g. modified or unmodified natural products such as sodium alginates, British gum, gum Arabic, crystal gum, locust bean gum, gum tragacanth, carboxymethyl cellulose, hydroxyethyl cellulose, starches, and synthetic products such as polyacrylamides and polyvinyl alcohols.

The dyeings and prints obtained with the new dyes have very good fastness properties, in particular good light fastness and very good fastness to washing, prespiration, gas fumes, rubbing, sublimation and heat setting.

The new dyes are, in addition, valuable pigments for the mass coloration of plastics, rubber, natural and synthetic resins, and solutions of these materials, and they can also be used for printing films, foils, paper and leather as well as textiles of natural fibers.

In the following examples the parts and percentages are by weight and the temperatures in degrees centigrade.

EXAMPLE 1

15 parts of 1-(2'-carboxyethylamino)-anthraquinone are suspended in 80 parts of dioxan. 20 parts of morpholine are added at 25°, then 4.5 parts of phosphorus trichloride are entered slowly which causes the temperature to rise to 65°. After a further 30 minutes at 65°, 10 parts of morpholine and 7 parts of phosphorus trichloride are added successively, which brings about a temperature increase to 80°. This temperature is maintained for 30 minutes, then the reaction mixture is run into 500 parts of water. The dye formed is filtered off, washed with water, and vacuum dried at 60°. It dissolves in chlorobenzene with an orange coloration.

EXAMPLE 2

15 parts of 1-(2'-carboxyethylamino)-2-methylanthraquinone are suspended in 80 parts of dioxan. 25 parts of o-methoxyaminobenzene are added at 25° and in the course of the next 30 minutes 10.5 parts of phosphorus trichloride are added slowly with simultaneous heating to 75°. After 15 minutes the reaction mixture is run into 500 parts of water, the dye formed filtered off, washed with water and vacuum dried at 60°. It dissolves in chlorobenzene to give orange-red solutions and dyes polyester fibers in brilliant red shades.

EXAMPLE 3

15 parts of 1-(2'-carboxyethylamino)-hydroxyanthraquinone are suspended in 80 parts of dioxan containing in solution 7 parts of o-chloroaminobenzene and 15 parts of pyridine. 4.5 parts of phosphorus trichloride are added slowly in 15 minutes, whereby the temperature increases to 50°. The reaction mixture is heated for 1 hour at 65°, then 150 parts of methyl alcohol are added and the dye formed is filtered off at room temperature, washed with water and dried at 100°. It melts at 196–198° and dissolves in chlorobenzene with a violet coloration. On polyester fibers it gives red-violet dyeings which are very fast to sublimation and heat setting.

EXAMPLE 4

15 parts of 1-(2'-carboxyethylamino)-4-hydroxyanthraquinone are suspended in 80 parts of dioxan containing 15 parts of pyridine in solution. At 35–40° C. a stream of ammonia is injected vigorously into the suspension. In the course of 30 minutes 4.5 parts of phosphorus trichloride are slowly added, the temperature being kept below 40°. Injection of gaseous ammonia is continued for a further two hours at 40° with constant stirring. Then 200 parts of 50% methyl alcohol are added. The dye formed is filtered off at 20°, washed with water and dried. It dissolves in chlorobenzene to give red-violet solutions.

On polyester fibers red-violet dyeings are obtained which have excellent sublimation fastness.

EXAMPLE 5

15 parts of 1-(2'-carboxyethylamino)-4-hydroxyanthraquinone are suspended in 100 parts of dioxan containing 25 parts of N-methylaminobenzene in solution. 4.5 parts of phosphorus trichloride are added slowly in 15 minutes. At the same time the temperature is increased to 80° and the reaction mixture maintained at this temperature for 30 minutes. On cooling to 25° the dye is precipitated by adding 100 parts of methyl alcohol and 100 parts of water. It is filtered off, washed with water and vacuum dried at 60°. It dissolves in chlorobenzene with a violet coloration.

EXAMPLE 6

15 parts of 1-(2'-carboxyethylamino)-4-hydroxyanthraquinone and 11.5 parts of 4-amino-2'-hydroxy-5'-methylazobenzene are suspended in 100 parts of chlorobenzene containing 22 parts of pyridine in solution. 5 parts of phosphorus trichloride are slowly added in 10 minutes at 40°, then the reaction mixture is heated to 80°. After 20 minutes it is cooled to 25°, the dye formed precipitated with 100 parts of methyl alcohol, filtered off, washed with methyl alcohol and dried at 100°. The dye forms brown solutions in chlorobenzene.

EXAMPLE 7

12 parts of 1-(2'-carboxyethylamino)-2-bromo-4-hydroxyanthraquinone are suspended in 80 parts of chlorobenzene. 8 parts of 4-amino-4'-chlorodiphenyl ether and 14 parts of pyridine are added. In 10 minutes 4 parts of phosphorous trichloride are slowly added, upon which the temperature increases to 50°. The reaction mixture is stirred at this temperature for 30 minutes. The dye formed is then precipitated by adding 80 parts of methyl alcohol, filtered off, washed with methyl alcohol and dried at 100°. It dissolves in chlorobenzene to give red-violet solutions.

EXAMPLE 8

12 parts of 1-(2'-carboxyethylamino)-4-phenylaminoanthraquinone are suspended in 80 parts of dioxan containing in solution 26 parts of 3-methoxypropylamine. In 30 minutes 4 parts of phosphorus trichloride are added, which brings about a temperature increase to 55°. The reaction mixture is stirred for 1 hour at 65° and then cooled to 25°, on which the dye is precipitated with 50 parts of methyl alcohol and 150 parts of water, filtered off, washed with water and dried at 100°. It dyes polyester fibers in blue-green shades.

EXAMPLE 9

12 parts of 1-(2'-carboxyethylamino)-2,3-dichloro-4-aminoanthraquinone are suspended in 80 parts of chlorobenzene containing in solution 10 parts of aminobenzene and 13 parts of pyridine. 5.5 parts of phosphorus trichloride are slowly added, causing a temperature increase to 45°. The reaction mixture is stirred for 1 hour at 60°; and, after cooling, 80 parts of methyl alcohol and 10 parts of 30% ammonia are added. The dye formed is filtered off, washed with methyl alcohol and dried at 100°. It dissolves in chlorobenzene with a reddish blue coloration.

EXAMPLE 10

12 parts of 1-(2'-carboxyethylamino)-5-amino-4,8-dihydroxyanthraquinone are suspended in 80 parts of chlorobenzene. 8 parts of o-aminodiphenylether and 13 parts of pyridine are added, followed by 4 parts of phosphorus trichloride, with simultaneous heating to 80°. The reaction mixture is stirred for 1 hour at 80°. 11 parts of pyridine and 2.5 parts of phosphorus trichloride are added, the mixture heated to 80° for 12 hours, and the chlorobenzene distilled off with water vapor. The residue is extracted with boiling benzene. On cooling, the dye crystallizes out of its benzolic solution. It dissolves in chlorobenzene with a blue coloration and dyes polyester fibers greenish blue.

EXAMPLE 11

12 parts of 1,4-di-(2′-carboxyethylamino)-anthraquinone are suspended in 100 parts of dioxan containing in solution 15 parts of aminobenzene and 28 parts of pyridine. In 30 minutes 8 parts of phosphorus trichloride are added. The reaction mixture is stirred for 1 hour at 80°, then 100 parts of methyl alcohol are added and, after cooling to 25°, 200 parts of water and 20 parts of 30% ammonia. The 1,4-di-(2′-carbanilidoethylamino)-anthraquinone thus formed is filtered off, washed with water and dried at 100°. It dissolves in chlorobenzene with a brilliant blue coloration.

EXAMPLE 12

15 parts of 1-(2′-carboxyethylamino)-4-hydroxyanthraquinone are suspended in 100 parts of chlorobenzene containing 8 parts of ortho-methoxyaminobenzene and 14 parts of pyridine in solution. 4.5 parts of phosphorus trichloride are added in 15 minutes. This causes a temperature increase to 50°. The reaction mixture is stirred at this temperature for 1 hour, and after cooling, 150 parts of methyl alcohol are added. The precipitated dye is filtered off and washed with methyl alcohol and then with water. On recrystallization from chlorobenzene it melts at 194–196°. The dye dissolves in chlorobenzene with a red-violet coloration. On polyester fibers it gives red-violet dyeings which are very fast to sublimation and heat setting.

In the following tables are set forth further disperse dyes of the anthraquinone series which are obtained by the operating procedures described in Examples 1 to 12. They are characterized by the carboxyalkylaminoanthraquinones and amines used as starting materials and the color of the dye in chlorobenzene solution.

TABLE 1

[New dyes from anthraquinone compounds containing one carboxyalkylamino group]

| Ex. No. | Carboxyalkylaminoanthraquinone (II) | Amine (III) | Color of dye in chlorobenzene solution |
| --- | --- | --- | --- |
| 13 | 1-(2′-carboxyethylamino)-anthraquinone | Aminobenzene | Orange. |
| 14 | do | 3-methoxy-propylamine | Do. |
| 15 | do | Diethylamine | Do. |
| 16 | 1-(2′-carboxyethylamino)-2-methylanthraquinone | Aminobenzene | Red-orange |
| 17 | do | Morpholine | Do. |
| 18 | do | o-Aminobenzoic acid methylester | Do. |
| 19 | 1-(2′-carboxyethylamino)-2-bromoanthraquinone | Aminobenzene | Do. |
| 20 | 1-(2′-carboxyethylamino)-4-aminoanthraquinone | do | Violet-blue. |
| 21 | do | p-Chloroaminobenzene | Do. |
| 22 | 1-(2′-carboxyethylamino)-4-hydroxyanthraquinone | Aminobenzene | Red-violet. |
| 23 | do | Cyclohexylamine | Do. |
| 24 | do | 2-ethylhexylamine | Do. |
| 25 | do | Benzylamine | Do. |
| 26 | do | ar-1-aminotetrahydronaphthalene | Do. |
| 27 | do | 4-aminoazobenzene | Do. |
| 28 | do | 2,4-dinitroaminobenzene | Do. |
| 29 | do | 3,5-di-(trifluoromethyl)-aminobenzene | Do. |
| 30 | do | m-Cyanoaminobenzene | Do. |
| 31 | do | p-Aminodiphenyl | Do. |
| 32 | do | o-Aminodiphenylether | Do. |
| 33 | 1-(2′-carboxyethylamino)-2-bromo-4-hydroxyanthraquinone | Morpholine | Do. |
| 34 | do | o-Chloroaminobenzene | Do. |
| 35 | do | p-Methoxyaminobenzene | Do. |
| 36 | do | Dibutylamine | Do. |
| 37 | 1-(2′-carboxyethylamino)-2-methoxy-4-hydroxyanthraquinone | Aminobenzene | Do. |
| 38 | 1-(2′-carboxyethylamino)-2-nitro-4-hydroxyanthraquinone | Morpholine | Blue. |
| 39 | 1-(2′-carboxyethylamino)-2-cyano-4-hydroxyanthraquinone | Aminobenzene | Do. |
| 40 | 1-(2′-carboxyethylamino)-2,3-dicyano-4-hydroxyanthraquinone | n-Amylamine | Do. |
| 41 | 1-(2′-carboxyethylamino)-4-phenylaminoanthraquinone | Aminobenzene | Green Blue. |
| 42 | do | Morpholine | Do. |
| 43 | do | Diethylamine | Do. |
| 44 | 1-(2′-carboxyethylamino)-2,3-dichloro-4-amino-anthraquinone | Morpholine | Blue-violet. |
| 45 | do | o-Methoxyaminobenzene | Do. |
| 46 | do | o-Aminobenzoic acid methylester | Do. |
| 47 | 1-(2′-carboxyethylamino)-5-amino-4,8-dihydroxy-anthraquinone | Aminobenzene | Blue. |
| 48 | do | p-Methoxyaminobenzene | Do. |
| 49 | do | 2-hydroxyethylamine | Do. |
| 50 | 1-(2′-carboxyethylamino)-8-amino-4,5-dihydroxy-anthraquinone | Aminobenzene | Do. |
| 51 | 1-(2′-carboxyethylamino)-4-amino-5,8-dihydroxy-anthraquinone | Morpholine | Do. |
| 52 | 1-(2′-carboxyethylamino)-5-amino-4,8-dihydroxy-2-bromo-anthraquinone | Aminobenzene | Do. |
| 53 | 1-(2′-carboxyethylamino)-5-amino-4,8-dihydroxy-3-(4′-methoxy)-phenylanthraquinone. | do | Do. |
| 54 | 1-(2′-carboxyethylamino)-anthraquinone | 3-ethoxypropylamine | Orange. |
| 55 | 1-(2′-carboxyethylamino)-2-methyl-anthraquinone | Dimethylamine | Red-orange. |
| 56 | 1-(2′-carboxyethylamino)-2-bromoanthraquinone | 1-amino-2-methyl-benzene | Do. |
| 57 | 1-(2′-carboxyethylamino)-4-bromoanthraquinone | Ammonia | Do. |
| 58 | 1-(2′-carboxyethylamino)-2,4-dibromoanthraquinone | 1-amino-2,4,6-trimethylbenzene | Orange. |
| 59 | 1-(2′-carboxyethylamino)-5-aminoanthraquinone | n-Propylamine | Red-orange. |
| 60 | 1-(2′-carboxyethylamino)-8-aminoanthraquinone | Benzylamine | Orange. |
| 61 | 1-(2′-carboxyethylamino)-4-hydroxyanthraquinone | 2-amino-diphenyl | Red-violet. |
| 62 | 1-(2′-carboxyethylamino)-2-bromo-4-hydroxyanthraquinone | 1-amino-2-bromo-benzene | Do. |
| 63 | 1-(2′-carboxyethylamino)-2-methoxy-4-hydroxy-anthraquinone | 1-(N-ethyl)-amino-4-methoxybenzene | Do. |
| 64 | 1-(2′-carboxyethylamino)-2-butoxy-4-hydroxy-anthraquinone | 1-amino-3-propyloxy-propane | Do. |
| 65 | 1-(2′-carboxyethylamino)-2,3-dimethoxy-4-hydroxy-anthraquinone | 1-amino-3-fluoro-benzene | Do. |
| 66 | 1-(2′-carboxyethylamino)-2-nitro-4-hydroxy-anthraquinone | Ammonia | Blue. |
| 67 | 1-(2′-carboxyethylamino)-3-nitro-4-hydroxy-anthraquinone | 1-amino-4-cyano-benzene | Do. |
| 68 | 1-(2′-carboxyethylamino)-2-cyano-4-hydroxy-anthraquinone | 1-amino-2,4-dimethyl-benzene | Do. |
| 69 | 1-(2′-carboxyethylamino)-2,3-dicyano-4-hydroxy-anthraquinone | 4-amino-diphenylether | Do. |
| 70 | 1-(2′-carboxyethylamino)-2-methyl-4-hydroxy-anthraquinone | Ammonia | Violet. |
| 71 | 1-(2′-carboxyethylamino)-2-phenoxy-4-hydroxy-anthraquinone | 1-amino-4-nitro-benzene | Red-violet. |
| 72 | 1-(2′-carboxyethylamino)-2,3-diphenoxy-4-hydroxy-anthraquinone | Cyclohexylamine | Do. |
| 73 | 1-(2′carboxyethylamino)-4-phenylamino-anthraquinone | ar-1-aminotetrahydronaphthaline | Bluish-green. |
| 74 | do | di-n-propylamine | Do. |
| 75 | 1-(2′-carboxyethylamino)-4-(4′-methoxyphenyl)-amino-anthraquinone | Ammonia | Do. |
| 76 | 1-(2′-carboxyethylamino)-4-cyclohexylamino-anthraquinone | 1-amino-4-butoxy-benzene | Blue. |
| 77 | 1-(2′-carboxyethylamino)-4-methylamino-anthraquinone | 1-amino-2-bromo-benzene | Do. |
| 78 | 1-(2′-carboxyethylamino)-4-n-butylamino-anthraquinone | Ammonia | Do. |
| 79 | 1-(2′-carboxyethylamino)-2-bromo-4-amino-anthraquinone | 1-amino-4-hydroxy-benzene | Do. |
| 80 | 1-(2′-carboxyethylamino)-2,3-dibromo-4-amino-anthraquinone | 1-amino-2-methoxy-benzene | Do. |
| 81 | 1-(2′-carboxyethylamino)-2-ethyl-4-amino-anthraquinone | Ammonia | Do. |
| 82 | 1-(2′-carboxyethylamino)-2,3-diethoxy-4-amino-anthraquinone | Methylamine | Do. |

TABLE 1—Continued

| Ex. No. | Carboxyalkylaminoanthraquinone (II) | Amine (III) | Color of dye in chlorobenzene solution |
|---|---|---|---|
| 83 | 1-(2'-carboxyethylamino)-2,3-di-(4'-methyl-phenyloxy)-4-amino-anthraquinone | 4-amino-diphenyl-sulfide | Do. |
| 84 | 1-(2'-carboxyethylamino)-2-(4'-methyl-phenyloxy)-4-amino-anthraquinone | 1-amino-4-isobutyl-benzene | Do. |
| 85 | 1-(2'-carboxyethylamino)-2-phenylthio-4-amino-anthraquinone | Aminobenzene | Bluish-green. |
| 86 | 1-(2'-carboxyethylamino)-2-n-butylthio-4-amino-anthraquinone | 4-amino-azobenzene | Do. |
| 87 | 1-(2'-carboxyethylamino)-2,3-di-(4'-methyl-phenyl-thio)-4-amino-anthraquinone | 1-amino-4-methyl-thio-benzene | Do. |
| 88 | 1-(2'-carboxyethylamino)-2,3-dicyano-4-amino-anthraquinone | Morpholine | Do. |
| 89 | 1-(2'-carboxyethylamino)-4-amino-anthraquinone-2,3-di-carboxylic acid imide | 1-amino-2-methoxy-benzene | Do. |
| 90 | 1-(2'-carboxyethylamino)-5-nitro-4,8-dihydroxy-anthraquinone | 1-amino-2,4-dicyano-benzene | Blue. |
| 91 | 1-(2'-carboxyethylamino)-8-nitro-4,5-dihydroxy-anthraquinone | 1-amino-4-methyl-benzene | Do. |
| 92 | 1-(2'-carboxyethylamino)-5-amino-4,8-dihydroxy-anthraquinone | Ammonia | Do. |
| 93 | 1-(2'-carboxyethylamino)-8-amino-4,5-dihydroxy-anthraquinone | di-iso-butyl-amine | Do. |
| 94 | 1-(2'-carboxyethylamino)-4-amino-5,8-dihydroxy-anthraquinone | 1-amino-3-butoxy-propane | Bluish-green. |
| 95 | 1-(2'-carboxyethylamino)-2-bromo-5-amino-4,8-dihydroxy-anthraquinone | Aminobenzene | Do. |
| 96 | 1-(2'-carboxyethylamino)-3-(4'-hydroxy)-phenyl-5-amino-4,8-dihydroxy-anthraquinone. | do | Do. |
| 97 | do | Ammonia | Do. |
| 98 | 1-(2'-carboxyethylamino)-3-(2'-hydroxy-8'-methyl)-phenyl-5-amino-4,8-dihydroxy-anthraquinone. | 1-amino-4-methyl-thio-benzene | Do. |
| 99 | 1-(2'-carboxy-2'-methyl-ethyl-amino)-4-hydroxy-anthraquinone | 4-amino-azobenzene | Violet. |
| 100 | 1-(2'-carboxy-1'-methyl-ethylamino)-anthraquinone | 3-methoxypropylamine | Orange-red. |
| 101 | 1-(2'-carboxy-2'-methyl-ethylamino)-anthraquinone | Morpholine | Do. |
| 102 | 1-(2'-carboxy-2'-methyl-ethylamino)-4-hydroxy-anthraquinone | Aminobenzene | Violet. |
| 103 | do | p-Ethoxyaminobenzene | Do. |

In Table 2 further new disperse dyes are set forth which are there characterized by the polyaminoanthraquinone (A) upon which the starting polycarboxyalkylaminoanthraquinone of the Formula II is based, by the number of carboxyalkylamino groups (B) in the starting polycarboxyalkylaminoanthraquinone, by the number of carboxyalkylamino groups (D) reacted with an amine of the Formula III(E), and by the color of the dye in chlorobenzene solution (F).

Dyeing method 0.6 part of the dye obtained according to Example 1, 0.6 part of the sodium salt of dinaphthylmethanedisulfonic acid and 11 parts of water are ground until a fine dispersion is formed, which is dried in a spray drier.

1.2 parts of this dyeing preparation are pasted with a little cold, soft water, and 4 parts of a highly sulfonated castor oil added to the paste with stirring. This is added to sufficient water to give a dyebath of 2800 parts. The bath is heated to 70°, at which temperature 200 parts of a 10% emulsion of 1-hydroxy-2-phenylbenzene at 70° are added with stirring. 100 parts of a fabric of a linear aromatic polyester fiber are entered, the bath brought to the boil and held at the boil for 1 hour. The fabric is removed, rinsed, treated for 20 minutes at 70° in a bath of 3000 parts of water and 1 part of an alkylphenol polyglycol ether, rinsed in warm and cold water, and dried at 60°. A bright dyeing with the good fastness properties mentioned above is obtained.

TABLE 2

New dyes from anthraquinone compounds containing several carboxyalkylamino groups

| Example No. | (A) | (B) | (D) | (E) | (F) |
|---|---|---|---|---|---|
| | (a) Poly-(2'-carboxyethylamino)-anthraquinones | | | | |
| 104 | 1,5-diaminoanthraquinone | 2 | 2 | Aminobenzene | Red. |
| 105 | 1,4-diaminoanthraquinone | 2 | 1 | do | Blue. |
| 106 | do | 2 | 2 | do | Do. |
| 107 | 1,4,5-triaminoanthraquinone | 2 | 2 | Morpholine | Do. |
| 108 | do | 3 | 2 | do | Do. |
| 109 | do | 3 | 3 | do | Do. |
| 110 | 1,4,5,8-tetraaminoanthraquinone | 2 | 2 | Aminobenzene | Do. |
| 111 | do | 3 | 3 | do | Do. |
| 112 | do | 4 | 4 | do | Green-blue. |
| 113 | 1,4-diamino-2-bromoanthraquinone | 2 | 2 | do | Blue. |
| 114 | 1,4-diamino-2,3-dichloroanthraquinone | 2 | 2 | Diethylamine | Do. |
| 115 | 1,4-diamino-2-methoxyantraquinone | 2 | 2 | Aminobenzene | Do. |
| 116 | 1,4-diamino-2,3-dicyanoanthraquinone | 2 | 2 | 3-methoxypropylamine | Green-blue. |
| 117 | 1,4-diamino-anthraquinone-2,3-dicarboxylic acid imide | 2 | 2 | Aminobenzene | Do. |
| 118 | 1,4-diamino-5,8-dihydroxyanthraquinone | 2 | 2 | do | Blue. |
| 119 | 1,5-diamino-4,8-dihydroxyanthraquinone | 2 | 2 | do | Do. |
| 120 | 1,8-diamino-4,5-dihydroxyanthraquinone | 2 | 2 | do | Do. |
| 121 | 1,5-diamino-4,8-dihydroxy-2-bromo-anthraquinone | 2 | 2 | Morpholine | Do. |
| 122 | 1,5-diamino-4,8-dihydroxy-3-(4'-hydroxy)-phenylanthraquinone | 2 | 2 | Aminobenzene | Do. |
| 123 | 1,5-diamino-4,8-dihydroxy-3-(4'-methoxy)-phenylanthraquinone | 2 | 2 | do | Do. |
| 124 | 1,4-diamino-5,8-dihydroxy-3-nitroanthraquinone | 2 | 2 | do | Do. |
| | (b) Poly-(2'-carboxy-1'methyl-ethylamino)-anthraquinones | | | | |
| 125 | 1,4-diaminoanthraquinone | 2 | 1 | n-Amylamine | Do. |
| 126 | do | 2 | 2 | do | Do. |
| | (c) Poly-(2'-carboxy-2'-methyl-ethylamino)-anthraquinones | | | | |
| 127 | 1,4-diaminoanthraquinone | 2 | 1 | Aminobenzene | Do. |
| 128 | do | 2 | 2 | do | Do. |
| 129 | do | 2 | 2 | 3-ethoxypropylamine | Do. |
| 130 | do | 2 | 2 | o-Bromoaminobenzene | Do. |
| 131 | do | 2 | 2 | o-Aminobenzoicacid ethyl ester | Do. |
| 132 | do | 2 | 2 | 1-amino-2-chloroethane | Do. |

Having thus disclosed the invention, what I claim is:
1. A disperse anthraquinone dye of the formula

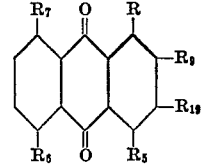

wherein R is a radical of the formula

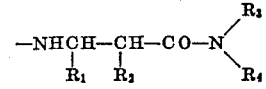

one of $R_1$ and $R_2$ is hydrogen and the other is a member selected from the group consisting of hydrogen and methyl;

$R_3$ is a member selected from the group consisting of hydrogen, alkyl having from 1 to 4 carbon atoms and, together with $R_4$ and the nitrogen to which both are bonded, morpholino;

$R_4$ is a member selected from the group consisting of hydrogen; alkyl having from 1 to 8 carbon atoms, unsubstituted or substituted, any substituents being selected from the group consisting of phenyl, hydroxy, chloro and lower alkoxy; cyclohexyl; phenyl; chlorophenyl; fluorophenyl; bromophenyl; nitrophenyl; dinitrophenyl; phenyl having one or more alkyl substituents of from 1 to 8 carbon atoms each; di-(trifluoromethyl)phenyl; alkoxyphenyl, the alkoxy of which has from 1 to 4 carbon atoms; hydroxyphenyl; methylthiophenyl; cyanophenyl; dicyanophenyl; (lower) alkoxycarbonylphenyl; phenoxyphenyl; chlorophenoxyphenyl; phenylphenyl; phenylazophenyl; (hydroxy- and methyl-substituted phenyl)azophenyl; phenylthiophenyl; ar-1-tetrahydronaphthyl; and, together with $R_3$ and the nitrogen to which both are bonded, morpholino;

$R_5$ is a member selected from the group consisting of hydrogen, bromo, primary amino, hydroxy, alkylamino having from 1 to 4 carbon atoms, cyclohexylamino, phenylamino, methoxyphenylamino and R;

each of $R_6$ and $R_7$ is, independently, a member selected from the group consisting of hydrogen, primary amino, hydroxy and R;

$R_9$ is a member selected from the group consisting of hydrogen; chloro; bromo; cyano; lower alkoxy; lower alkylthio; phenoxy; (lower)alkylphenoxy; phenylthio; (lower)alkylphenylthio; together with $R_{10}$, dicarboxylic acid imide; and, when $R_{10}$ is hydrogen, nitro; and $R_{10}$ is a member selected from the group consisting of hydrogen; chloro; bromo; cyano; lower alkoxy; lower alkylthio; phenoxy; (lower)alkylphenoxy; phenylthio; (lower)alkylphenylthio; (lower)alkoxyphenyl; together with $R_9$, dicarboxylic acid imide; and, when $R_9$ is hydrogen, a member selected from the group consisting of nitro, hydroxyphenyl, (lower)alkoxyphenyl and (hydroxy- and methyl-substituted) phenyl.

2. A disperse anthraquinone dye according to claim 1 wherein $R_4$ is a member selected from the group consisting of alkyl having 1 to 8 carbon atoms, phenylmethyl, 2-hydroxyethyl, 2-chloro-ethyl, 3-methoxypropyl, 3-ethoxypropyl, 3-propyloxypropyl, 3-butoxypropyl, cyclohexyl, phenyl, 2-chlorophenyl, 3-fluorophenyl, 2-bromophenyl, 4-chlorophenyl, 4-nitrophenyl, 2,4-dinitrophenyl, 2-methylphenyl, 4-methylphenyl, 2,4-dimethylphenyl, 2,4,6-trimethylphenyl, 4-isobutylphenyl, 3,5-di(trifluoromethyl)-phenyl, 2-methoxyphenyl, 4-methoxyphenyl, 4-ethoxyphenyl, 4-butoxyphenyl, 4-hydroxyphenyl, 4-methylthiophenyl, 3-cyanophenyl, 4-cyanophenyl, 2,4-dicyanophenyl, 2-methoxycarbonylphenyl, 2-ethoxycarbonylphenyl, 4-phenoxyphenyl, 4-(4'-chlorophenoxy)-phenyl, 2-phenyl-phenyl, 4-phenylphenyl, 4-phenylazophenyl, 4-(2'-hydroxy-5'-methylphenylazo)-phenyl, 4-phenylthiophenyl, ar-1-tetrahydronaphthyl and, together with $R_3$ and the nitrogen to which both are bonded, morpholino;

$R_5$ is a member selected from the group consisting of hydrogen, bromine, primary amino, hydroxy, alkylamino having 1 to 4 carbon atoms, cyclohexylamino, phenylamino, methoxyphenylamino and R;

$R_6$ is a member selected from the group consisting of hydrogen, primary amino, hydroxy and R;

$R_7$ is a member selected from the group consisting of hydrogen, primary amino, hydroxy and R;

$R_9$ is a member selected from the group consisting of hydrogen, chlorine, bromine, cyano, methoxy, ethoxy, butoxy, butylthio, phenoxy, 4-methylphenoxy, phenylthio, 4-methylphenylthio and, together with $R_{10}$, dicarboxylic acid imide; and when $R_{10}$ is hydrogen, a nitro group; and $R_{10}$ is a member selected from the group consisting of hydrogen, chlorine, bromine, cyano, methoxy, ethoxy, phenoxy, 4-methylphenoxy, 4-methylphenylthio and, together with $R_9$, dicarboxylic acid imide; and when $R_9$ is hydrogen, a member selected from the group consisting of nitro, 4-hydroxyphenyl, 4-methoxyphenyl and 2-hydroxy-5-methylphenyl; at most one of $R_5$, $R_6$ and $R_7$ being a radical, R.

3. The compound according to claim 2 of the formula

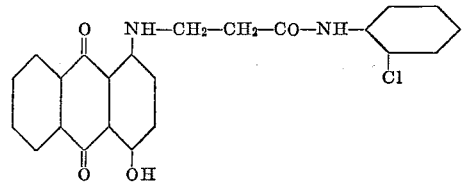

4. The compound according to claim 2 of the formula

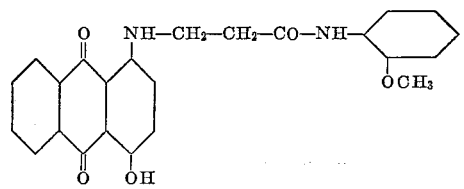

5. The compound according to claim 2 of the formula

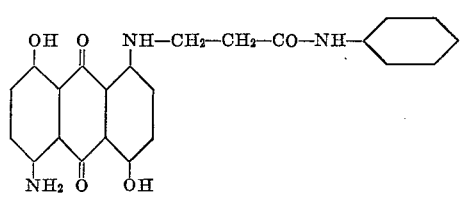

6. The compound according to claim 2 of the formula

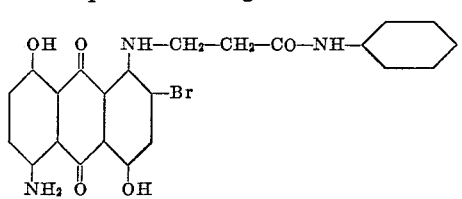

7. The compound according to claim 2 of the formula

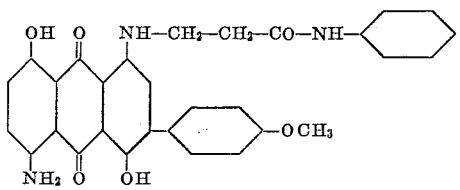

8. The compound according to claim 2 of the formula

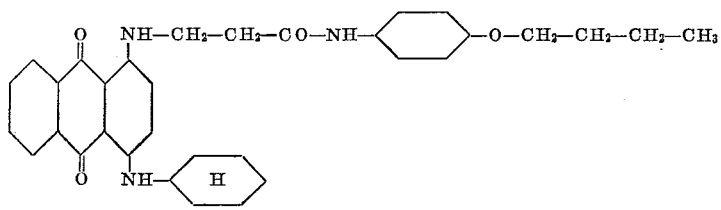

9. The compound according to claim 2 of the formula
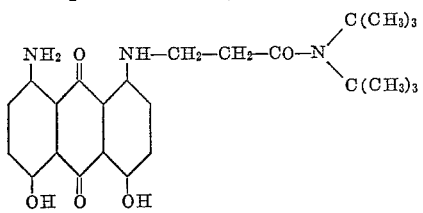
10. The compound according to claim 1 of the formula
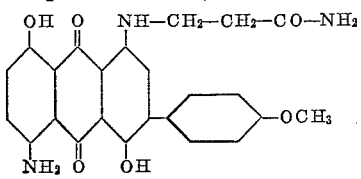
References Cited
UNITED STATES PATENTS
2,559,787  7/1951  Olpin et al. _____ 260—377
FOREIGN PATENTS
735,299  8/1932  France.
1,127,017  4/1962  Germany.
LORRAINE A. WEINBERGER, *Primary Examiner.*
H. C. WEGNER, *Assistant Examiner.*
U.S. Cl. X.R.
8—39, 40; 260—205, 206, 247.1, 247.5, 326

PO-1050
(5/69)

UNITED STATES PATENT OFFICE
CERTIFICATE OF CORRECTION

Patent No. 3,418,342  Dated December 24, 1968

Inventor(s) Paul Buecheler

It is certified that error appears in the above-identified patent and that said Letters Patent are hereby corrected as shown below:

Column 2, line 62, formula (IV) should read

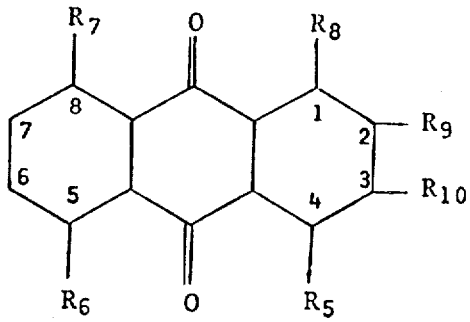

Column 5, line 52, "1-(2'-carboxyethylamino)-" should read --1-(2'-carboxyethylamino)-4- --. Column 6, line 37, "phosphorous" should read --phosphorus--. Column 9, table 1, Example 97, "do" should read --1-(2'-carboxyethylamino)-3-(4'-methoxy)-phenyl-5-amino-4,8-dihydroxy-anthraquinone--; Example 98, "-8'" should read -- -5'--; Table 2, first line under (A) "(2'-carboxy3thylamino)" should read --(2'-carboxyethylamino)--; Example 115, "methoxyantraquinone" should read --methoxyanthraquinone--; Example 124, (b), "1'" should read --1'- --; line 62, "III(E)" should read --III (E)--. Column 10, claim 1, right portion of formula, "$R_{19}$" should read --$R_{10}$--. Column 11, line 17, "(lower) alkoxycarbonylphenyl" should read --(lower)alkoxycarbonylphenyl--.

SIGNED AND
SEALED

MAR 17 1970

(SEAL)
Attest:

Edward M. Fletcher, Jr.
Attesting Officer

WILLIAM E. SCHUYLER, JR.
Commissioner of Patents